United States Patent
Korpinen et al.

(10) Patent No.: US 9,015,393 B2
(45) Date of Patent: Apr. 21, 2015

(54) MASTER-SLAVE INTERFACE

(75) Inventors: Pekka Olavi Korpinen, Espoo (FI); Pekka Eerikki Leinonen, Turku (FI)

(73) Assignee: Nokia Corporation, Espoo (FI)

( * ) Notice: Subject to any disclaimer, the term of this patent is extended or adjusted under 35 U.S.C. 154(b) by 394 days.

(21) Appl. No.: 13/418,414

(22) Filed: Mar. 13, 2012

(65) Prior Publication Data

US 2013/0246675 A1    Sep. 19, 2013

(51) Int. Cl.
G06F 13/00    (2006.01)
G06F 13/42    (2006.01)
G06F 11/00    (2006.01)

(52) U.S. Cl.
CPC ..................... G06F 13/42 (2013.01)

(58) Field of Classification Search
USPC ............. 710/8, 14, 15, 18–19, 105–106, 110; 714/2, 746, 799
See application file for complete search history.

(56) References Cited

U.S. PATENT DOCUMENTS

| | | | | |
|---|---|---|---|---|
| 4,107,651 | A * | 8/1978 | Martin | 714/709 |
| 6,275,167 | B1 * | 8/2001 | Dombrowski et al. | 340/12.1 |
| 6,529,046 | B1 * | 3/2003 | Shih | 327/34 |
| 2004/0246341 | A1 | 12/2004 | Lee et al. | |
| 2005/0162129 | A1 * | 7/2005 | Mutabdzija et al. | 320/116 |
| 2005/0174094 | A1 | 8/2005 | Purdy et al. | |
| 2006/0085653 | A1 | 4/2006 | Bollinger et al. | |
| 2008/0177916 | A1 * | 7/2008 | Cagno et al. | 710/110 |
| 2010/0073837 | A1 * | 3/2010 | Predtetchenski et al. | 361/91.5 |

FOREIGN PATENT DOCUMENTS

DE    10003705 A1 *  8/2001
EP     0480647 A2     4/1992

OTHER PUBLICATIONS

International Application No. PCT/FI2013/050170—International Search Report dated Sep. 3, 2013.

* cited by examiner

*Primary Examiner* — Thomas J Cleary
(74) *Attorney, Agent, or Firm* — Banner & Witcoff, Ltd.

(57) ABSTRACT

A bus interface couples a master device and one or more slave devices. Upon detecting a condition on the bus, one or more of the slave devices may force an extension of the bus condition for a predetermined time period. The forced extension may comprise forcing a voltage level, causing other devices on the bus to change modes. A master on the bus may detect an out-of-variance bus condition and, in response, take action to change the bus state to a stable condition. The bus interface may include power contacts and a single-wire bus for communicating between a host device and one or more battery packs.

16 Claims, 6 Drawing Sheets

MASTER-SLAVE INTERFACE

BACKGROUND

Mobile devices, such as cellular telephones, laptop computers, e-readers, and personal digital assistants, all use batteries in order to be portable. In recent years, the Mobile Industry Processor Interface (MIPI) Alliance has developed a standard interface between batteries and mobile devices. The Battery InterFace (BIF) specification defines an electrical and communication interface between batteries and mobile devices. The BIF specification supports both low-cost batteries and so-called "smart" batteries that contain active elements for handling security features (e.g., authentication) and other more advanced battery functions such as temperature monitoring.

In some situations, a glitch may occur between a battery pack and host device.

SUMMARY

This section presents a brief summary of some variations of the invention. It is not intended to identify critical or required elements of the invention. The invention may be practiced without incorporating many or all of the features described in this section.

In some variations, when a slave exits a mode upon detecting a transition on a bus, it drives the bus at the transition level for an extended duration, ensuring that other components on the bus detect the extended duration level. In the glitch-free case (e.g., a real interrupt), this causes the low pulse on the bus to be extended (no use but no harm). In a glitch case, this basically extends the glitch and allows others (including the master) to detect the condition, avoiding the need for the master to conduct periodic polling.

In some variations, the master may send a command, such as an enable interrupt command, at a slower speed and thus increase the $T_{BIF}$ time. This has two effects. First, the duration of the glitch that causes the issue in the first place may be reduced. Second, this may extend the time the slave drives the bus low, and thus may be easier to detect by the master.

Optionally, the master may be implemented in a way that it can detect short contact breaks. This optional feature may protect against a longer contact break that overlaps the whole extended glitch driven by the slave.

Some variations of the invention include a master and slave system (and components thereof) that perform various functions such as those described above, and a memory or other computer-readable medium having stored therein instruction which, when executed, perform functions such as those described above.

DETAILED DESCRIPTION

Figure 1:
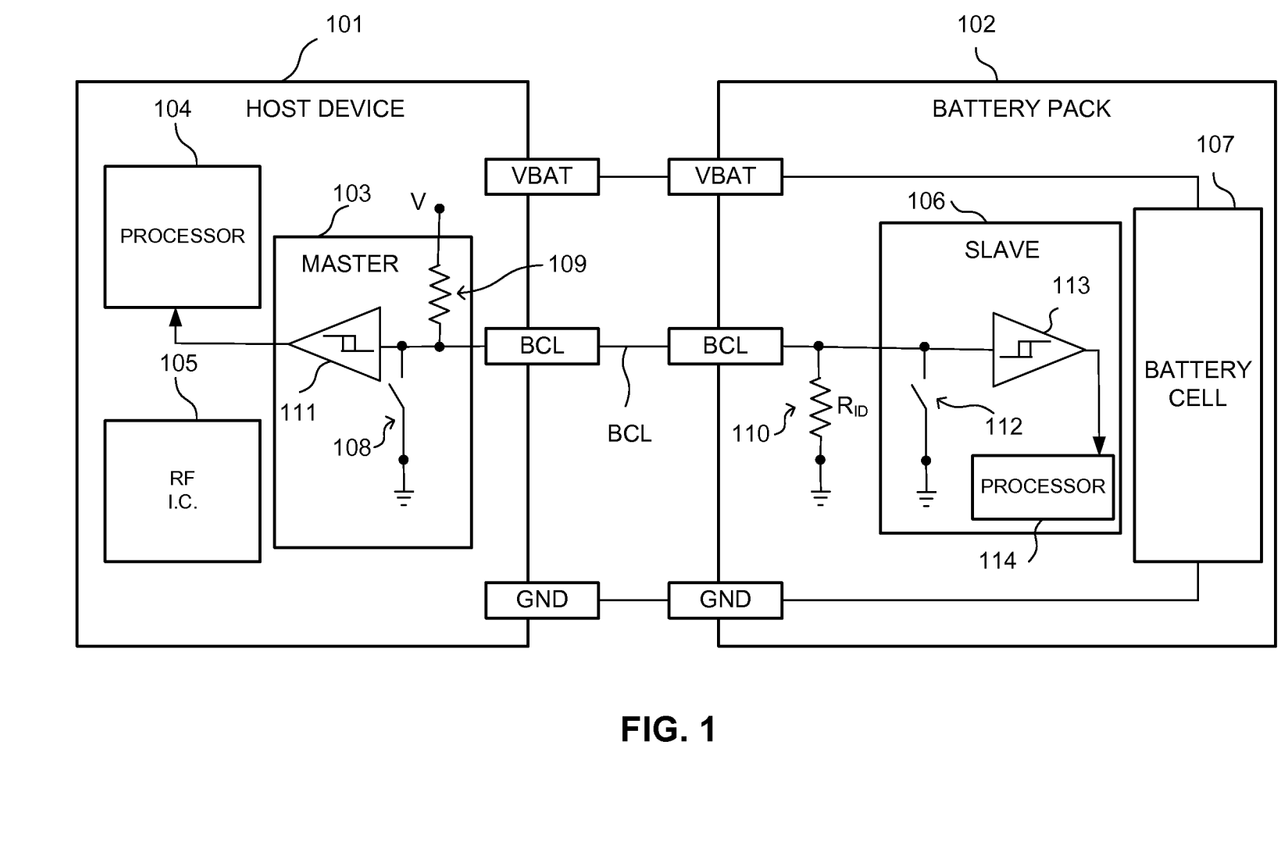
FIG. 1 illustrates an exemplary battery interface including electrical connections between a host device 101 and a battery pack 102.

In reference to the OSI reference model, the BIF specification defines both physical and data link layers. As shown in FIG. 1, a host device 101 (e.g., a mobile phone) is coupled to a battery pack 102 through a set of paired connectors VBAT (battery voltage), BCL (battery communication line), and GND (ground). The host device 101 may comprise a master communication unit 103, whereas the battery pack 102 may comprise one or more slave units 106. Battery pack 102 also includes a battery cell 107, which is coupled to the host device 101 through connectors VBAT and GND to supply power to host device 101. Although not shown in FIG. 1, other slave units may also be coupled to BCL within host device 101 and/or in other battery packs.

Communication between the host device 101 and battery pack 102 is performed over the single BCL line by switching the BCL to GND. Master 103 transmits data by activating switch 108 (via processor 104 or another circuit component within host device 101), whereas slave 106 transmits data by activating switch 112 (via processor 114). Data is received in each unit over the BCL and may be passed through respective Schmitt triggers 111 and 113 to help with noise suppression on the BCL bus. Processors 104 and 114 in each unit may execute instructions to transmit and receive data over the bus. Host device 101 may also include one or more other components, such as RF integrated circuit 105, for performing functions such as communicating over a wireless network.

Signaling (e.g., data transmission) between host device 101 and battery pack 102 is based on the elapsed time between changes of signal level on the BCL. Bits are transmitted by modulating the duration between signal toggles, similar to pulse-width modulation. (The BIF specification refers to this as Time Distance Coding). The duration of the short bit is $\tau_{BIF}$, and the duration of the long bit is $3\tau_{BIF}$, where $\tau_{BIF}$ is the BIF time base. The BIF time base is defined by the master for every data word with a training sequence. Each word begins with a training sequence, which provides a fixed reference period of $4\tau_{BIF}$ between two falling edges, to calibrate the slave timing to the transmission speed.

The master may choose any $\tau_{BIF}$ within specified boundaries, and it may change the $\tau_{BIF}$ used from one data word to another. Communication is initiated by the master, and the communication speed is set by the master. The slave adapts to the speed on each command and uses the same speed when replying.

The master 103 has a pull-up resistor 109 (in active communication typically a few kilo-Ohms, in idle mode typically a few hundred kilo-Ohms) on the bus. The slave 106 has a pull-down resistor 110 typically varying between 240 kOhm to 450 kOhm for detecting the battery type and the battery removal. The slave's pull-down resistor 110 has a resistance $R_{ID}$ that may be sensed by host device 101 as a voltage divider in order to determine battery capacity, battery type, or other parameters.

The BCL bus may be in one of four modes: Active, Standby, Power-down, or Interrupt mode. The Interrupt mode is used when waiting for an interrupt event generated by a slave. The Interrupt mode is entered when the master sends an enable interrupt (EINT) command on the BCL, allowing any slave devices coupled to BCL to initiate an interrupt to master device 103. When an interrupt occurs, host device 101 polls registers in each slave device to determine what interrupt occurred and, based on the interrupt, handles it appropriately. The Interrupt mode ends when either of the following conditions occurs:

Condition 1: When a slave detects an internal interrupt, it drives the BCL bus low for the duration of $\tau_{BIF}$ and exits the Interrupt mode and enters Active mode.

Condition 2: When a master or a slave detects the bus low for $\tau_{BIF}$ duration, it exits the Interrupt mode and enters Active mode.

A glitch may occur on the communication line BCL due to movement of the battery pack, causing a short disconnection at the battery connector. Because of the pull-down resistor 110 in the battery pack, the BCL line at the slave side goes low during the glitch, which may cause the slave to incorrectly detect Condition 2. Because the master has the pull-up resistor 109, the BCL line stays high at the host side and thus the glitch, and more importantly, the exit condition of the Interrupt Mode, is never seen by the master.

Figure 2:
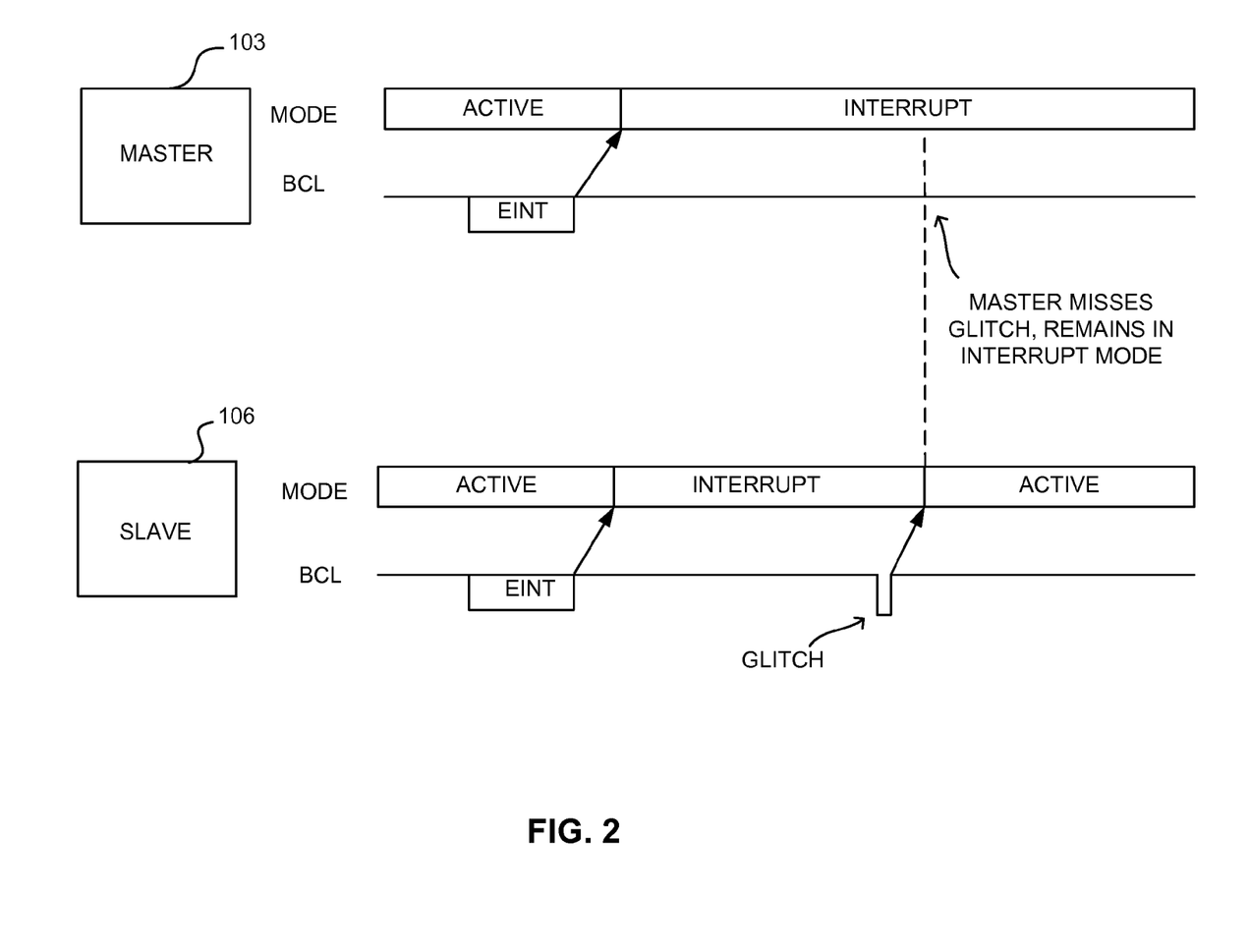
FIG. 2 illustrates an example of a glitch that may cause a slave to exit a first mode without a master detecting that the mode was exited.

Turning to FIG. 2, master 103 and slave 106 are initially in Active mode. After a period of time, master 103 issues an EINT command on the BCL, which causes both the master and slave to enter the Interrupt mode. After a second period of time, a glitch on the BCL is seen by the slave, causing it to exit the interrupt mode and re-enter the Active mode. However, the master 103 may not detect the glitch, so it remains in interrupt mode. This mismatched situation leads the master to continue waiting indefinitely for an interrupt, whereas the slave or slaves will not generate interrupts because they have switched to Active mode.

This situation may affect most seriously the use case where the slave is used to continuously monitor the battery temperature via a temperature sensing function using its threshold capability (i.e. generating an interrupt when temperature is outside the given window).

If the interrupt mode cannot be trusted, the master must exit the Interrupt mode periodically, check the condition of the slaves, and re-enter the Interrupt mode. This may increase power consumption and require processor time.

Figure 3:
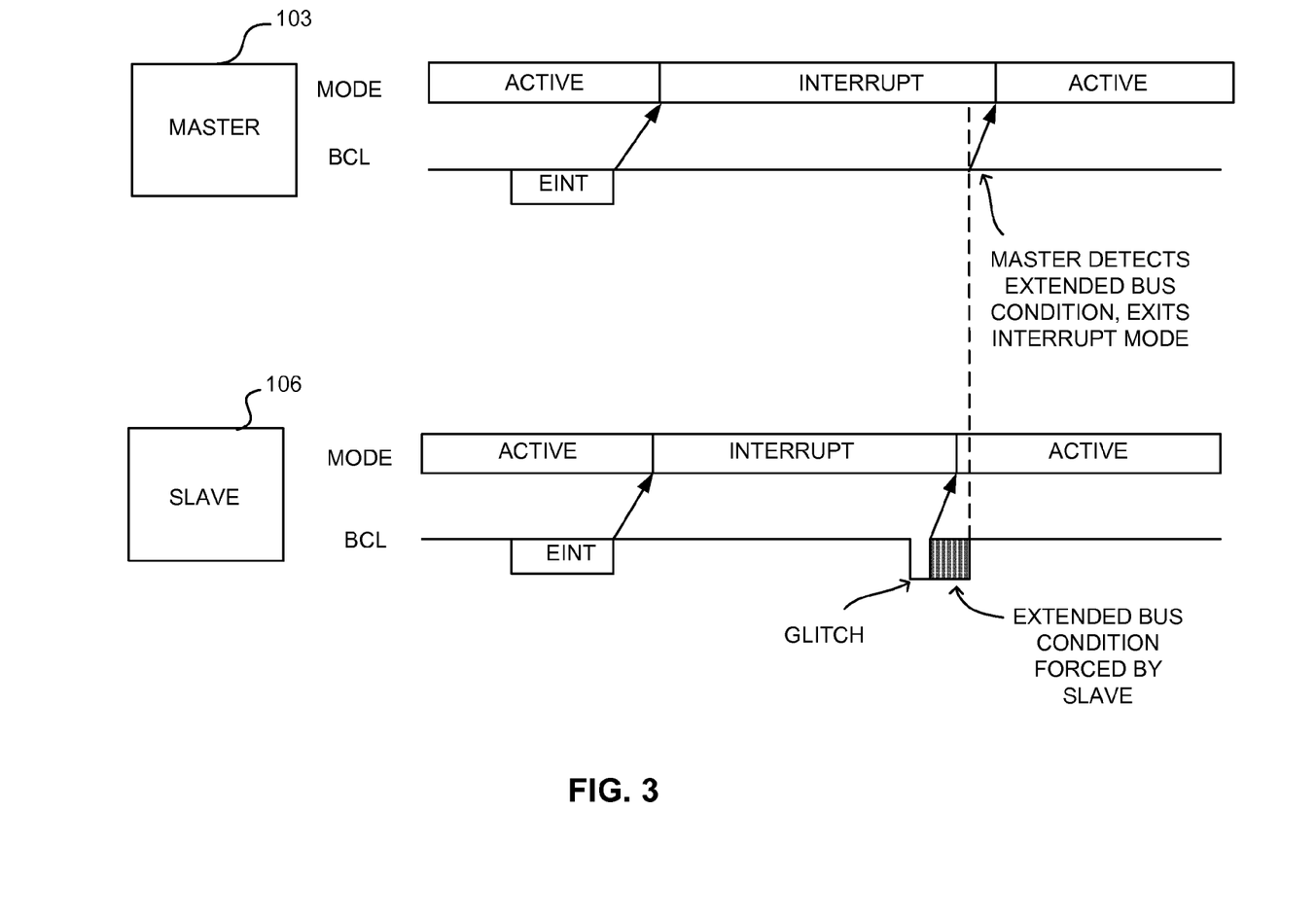
FIG. 3 illustrates an exemplary method for extending a detected condition on a bus.

FIG. 3 illustrates a method for extending a detected condition on a bus, such as a glitch, in accordance with some variations of the invention. Like the situation illustrated in FIG. 2, a master device 103 and slave device 106 begin in Active mode, and the master 103 issues an enable interrupt command EINT, causing both the master and slave to transition to the Interrupt mode. Other slaves on the bus (not shown) also transition to the Interrupt mode.

When a glitch occurs, the slave may detect the transition on the bus and, according to certain variations, the slave extends the bus condition (e.g., holding the bus down to ground) for an extended period of time, ensuring that the master detects the transition. Thereafter, both the master and the slave transition to the Active mode.

In some variations, the slave may extend the bus condition for a sufficiently long time that it can be reasonably certain that other devices on the bus will interpret the pulse as an interrupt command. For example, very short pulses can be extended to at least $\tau_{BIF}$ duration, and possibly to a multiple of $\tau_{BIF}$. If the glitch is "long" (e.g., as long as or longer than $\tau_{BIF}$), the slave may not need to extend the bus condition at all, because it can be reasonably certain that other devices on the bus will interpret it as an interrupt command.

In some variations, circuitry similar to that used to detect battery removal may be used to detect the short voltage spikes. For example, a digital filter may send a short contact interrupt immediately when a comparator detects a voltage above the battery removal threshold. In other variations, circuitry may be configured to detect that current from the host to slave decreases, signaling a contact break. Other variations are of course possible.

In a normal state, the bus's voltage level is based on the voltage divider R_up/R_down. R_down. On a contact break, the R_down disappears and thus the bus voltage goes close to the pull-up voltage, i.e. higher than the logic 1. If these short contact breaks are detected and indicated to the master via an interrupt, then the host may be able to recover faster from a potential error condition. Thus, according to some variations, the host may see one or both of the following events when there is a short contact break in the battery communication line:

1. An extended glitch (FIG. 3). This is detected by the host as a normal interrupt exit condition.

Figure 4:
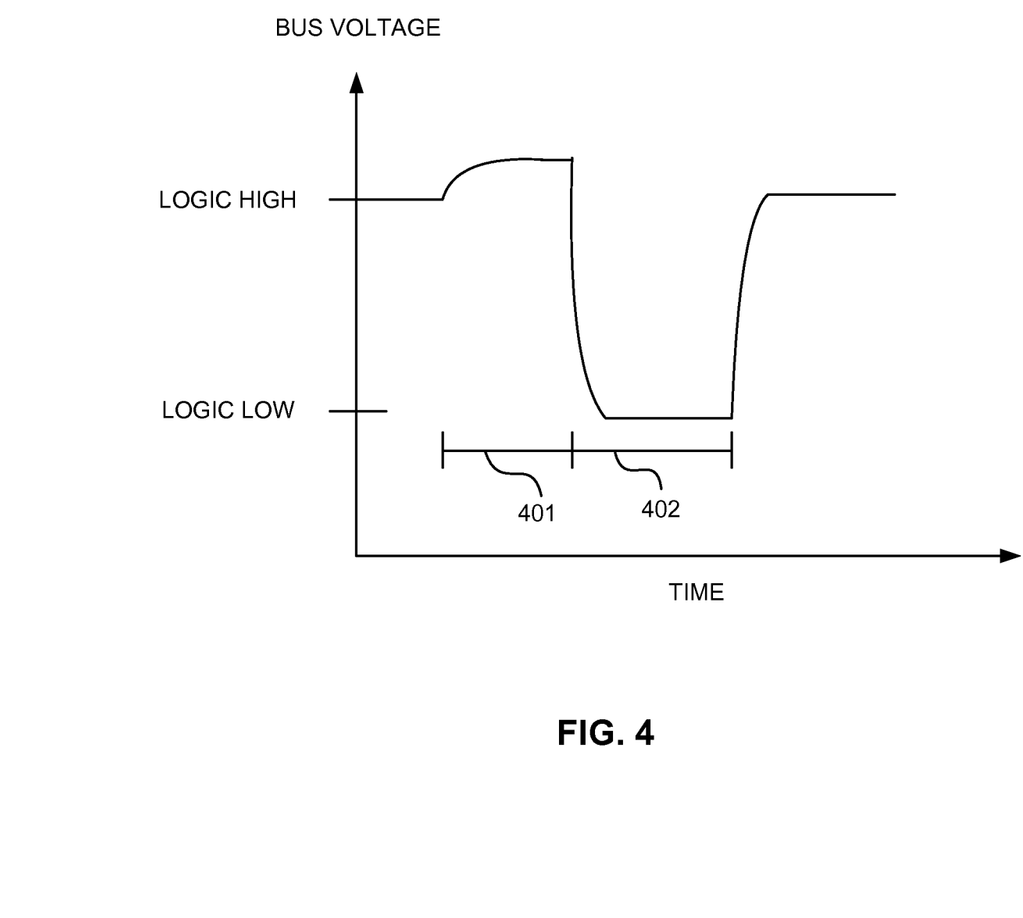
FIG. 4 shows an example of a bus voltage during a contact break as seen on the master side of the bus.

2. A short pulse that is higher than logic 1 (FIG. 4). This may be detected by the host as an interrupt signal from a voltage comparator, for example.

FIG. 4 shows an example of a bus voltage during a contact break as seen on the master side of the bus, including a first time period 401 during which the bus voltage is a short pulse that is briefly higher than a logic 1 level. In some variations, a detected voltage level that exceeds a valid logic level on the bus is treated as an out-of-variance bus condition that causes further action, as described below. During a second time period 402, the bus level is driven low for an extended period of time by the slave unit, such as due to an interrupt.

Upon detecting the out-of-variance bus condition 401 (e.g., a detected voltage level that exceeds a valid logic level on the bus), the host may first wait for the bus to settle, then create a wake-up pulse if the bus was previously in non-Active mode to wake up the slaves, then check that it can communicate with the slaves. Upon detecting the interrupt 402, the host may proceed as with a normal interrupt (e.g., check interrupt source, process the interrupt if any, and re-enable interrupts). The normal interrupt process at the host side comprises the following: First, the host gets the interrupt pulse (which may be the extended glitch). Second, the host reads the Interrupt Status registers (IRQ_STS) of each slave, using a command (for example) specified in the BIF specification. If there are interrupts, they are processed and the IRQ_STS flags are reset. Finally, the bus may be ordered back to interrupt mode using the EINT command.

If events 401 and 402 are closely timed, the procedure described for event 402 should cover event 401 as well. That is, the bus does not need a separate wake-up as a low pulse was detected, and the communication check can be accomplished implicitly when reading the interrupt status registers.

Detecting short contact breaks at the host may also be used in other situations, for example in the Power Down or Standby states, in which short contact breaks might wake up a slave device. Because normally the host would not detect the breaks, detecting the short high pulse can be used to determine that a slave may have awakened, causing the host to again set it to sleep mode or ordering it into a different mode.

Figure 5:
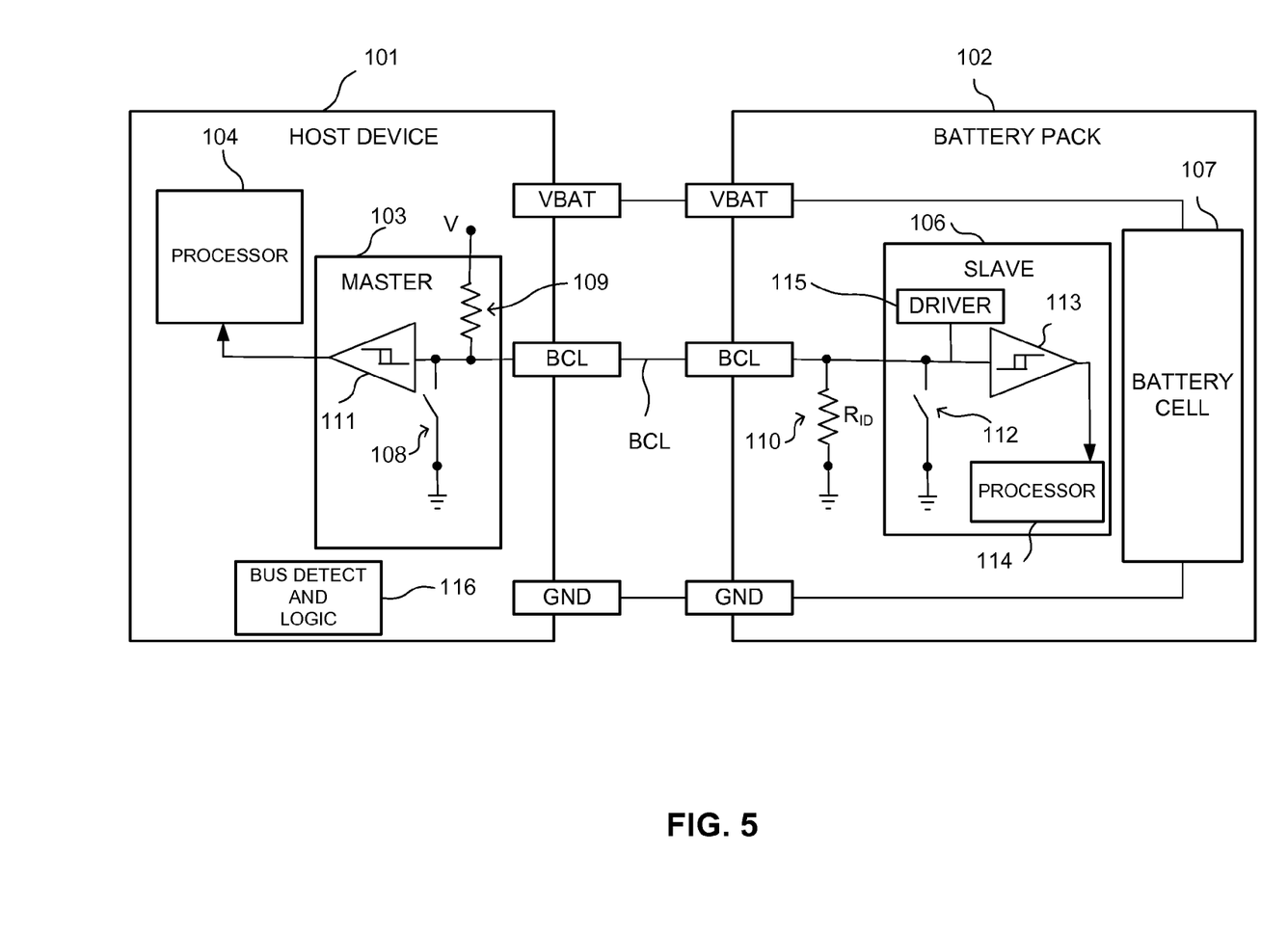
FIG. 5 illustrates an exemplary battery interface incorporating various features described herein.

FIG. 5 illustrates a battery interface incorporating various features described herein. The arrangement shown in FIG. 5 is similar to that shown in FIG. 1, except that the host device and slave device have been augmented with certain functions that perform as explained above. Starting with the right side of FIG. 5, battery pack 102 includes a driver circuit 115 that drives bus BCL by extending a bus condition detected on the bus. As explained above, for example, driver circuit 115 may hold down the BCL line for a minimum time period sufficient to trigger a mode change in master 103. Driver circuit 115 may be implemented in software (e.g., a memory of processor 114), such that when processor 114 detects a low pulse on the BCL bus, it instructs driver circuit 115 to force the BCL bus low for a predetermined period of time, extending the detected bus condition. Alternatively, driver circuit 115 may be implemented as a separate circuit with analog and/or digital components.

The left side of FIG. 5 shows that host device 101 includes a bus detect and logic circuit 116, which as explained above may detect a voltage level higher than a predetermined value (e.g., high logic level) on the BCL bus. In response to the detection, bus detect and logic circuit 116 may issue a command to one or more slaves, wherein the command causes the slaves to enter a different mode or state. As with driver 115, the functions of circuit 116 may be incorporated into processor 104 and its associated memory storing instructions (not shown), or they may be implemented in a separate circuit. As with the slave circuitry discussed above, this circuitry may detect the condition in various ways. For example, when the host detects that the battery pack is sinking less current than the highest allowed battery resistor value, the host may interpret this as a contact break or battery removal. In general, the above structural elements, or parts thereof, may be seen as means for performing operations to implement one or more embodiments of the invention. For example, these means may include means for processing or analyzing data, means for detecting conditions on a bus, means for communicating via a bus, means for driving a voltage level of a bus, means for communicating by modulating a duration of signal levels on a bus, means for transitioning between modes associated with a device, and/or means for receiving or transmitting commands.

In some variations, the master may send a command, such as an enable interrupt command, at a slower speed and thus increase the $\tau_{BIF}$ time. For example, the specification allows the master to choose a communication speed for each word. The master may choose a speed for the enable interrupt command that is slower than most or all speeds selected for other words and commands used on the bus.

This may have two effects. First, the duration of the glitch that causes the issue in the first place may be reduced. Second, this may extend the time the slave drives the bus low, and thus may be easier to detect by the master.

The functions outlined above in both the master and slave may be implemented in hardware, software, or a combination of the two, including such structures as application-specific integrated circuits (ASICs), field-programmable gate arrays (FPGAs) and other known structures. One or more tangible computer-readable media, such as one or more memories, may store executable instructions that, when executed by one or more processors, perform the functions described herein.

Figure 6:
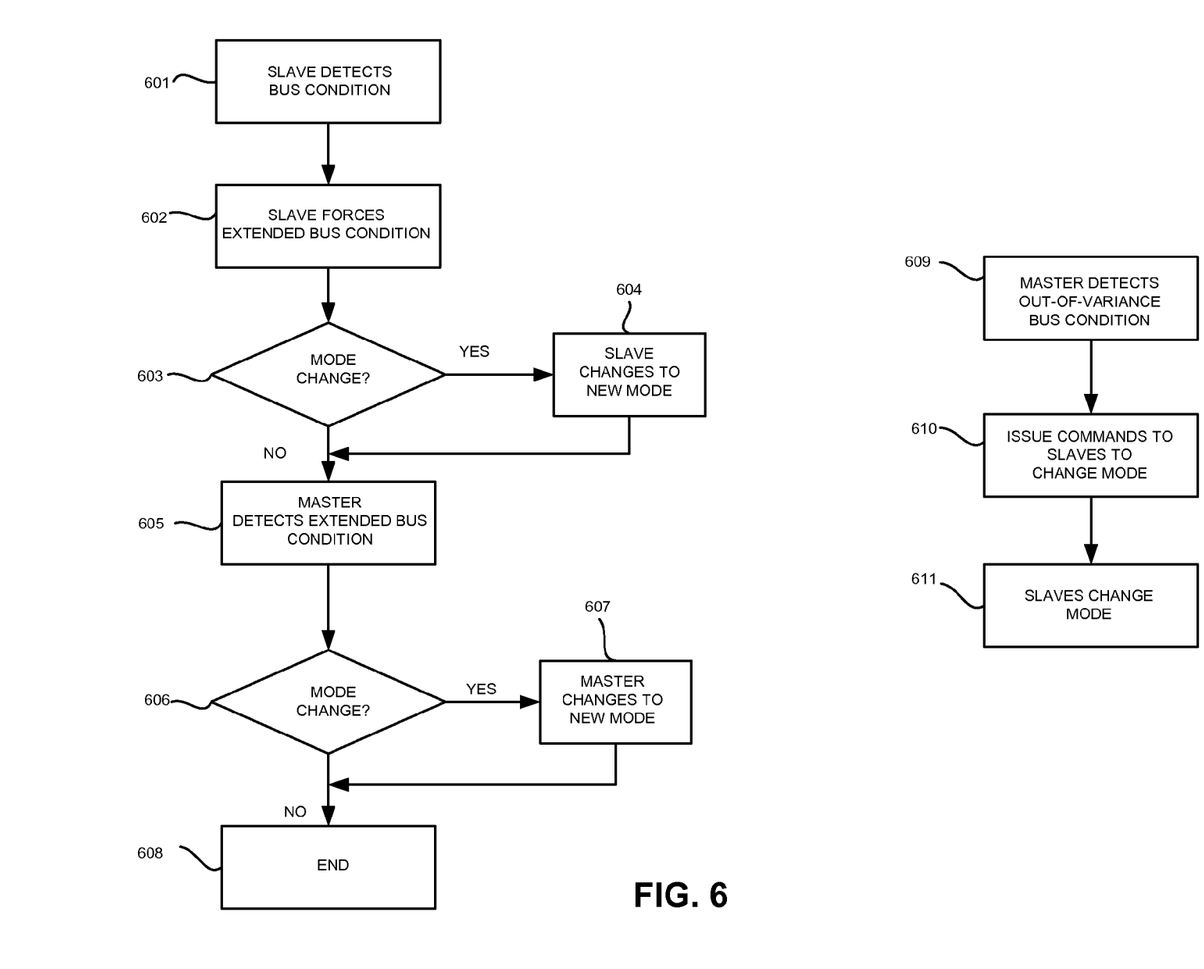
FIG. 6 illustrates an exemplary flow chart including steps and functions that may be carried out in certain variations of the invention.

FIG. 6 illustrates a flow chart including steps and functions that may be carried out in certain variations of the invention. Starting with the left side of FIG. 6, in step 601 a slave in a master-slave system (e.g., a BIF-compliant battery/host system) detects a bus condition, such as a low voltage level on the bus. In response to detecting the bus condition, in step 602 the slave forces an extended bus condition. In some variations, this may include forcing a low voltage level on the bus for an extended time duration (e.g., a predetermined minimum duration corresponding to a mode change signal), causing other devices on the bus to interpret the forced condition as a mode change.

In step 603, the slave may determine whether the forced condition constitutes a mode change to the slave device. For example, if the slave was originally in an Interrupt mode, it may transition to an Active mode. Other examples of modes that the slave may transition to include Standby mode and Power-down mode. If the forced condition corresponds to a mode change, then in step 604 the slave changes to the new mode.

In step 605, the master detects the extended bus condition on the bus. For example, the master may detect that the voltage level on a BCL bus has been held low for a sufficient period of time so as to signal a mode change. As one example, if the master was originally in an Interrupt mode, it may transition to an Active mode based on the extended bus condition. Other examples of modes that the master may transition to include Standby mode and Power-down mode. In step 606, the master may determine whether it should transition to a different mode. If the forced condition corresponds to a mode change, then in step 607 the master changes to the new mode.

In step 608, the process may end.

The right side of FIG. 6 illustrates other steps that may be performed by the master and slave. In step 609, the master may detect an out-of-variance bus condition. For example, the master may detect a voltage spike that is higher than a specified range and duration for logic 1 level. Such a spike might be generated, for example, by a battery pack being connected, disconnected, or jostled, causing a short voltage spike on the bus.

In step 610, in response to detecting the out-of-variance bus condition, the master may take action to change the bus state to a stable condition. For example, the master may issue one or more commands to slaves on the bus, such as a command to change to a different mode. For example, the master may command the slaves to reset, to stand by, to power down, and/or to enter other modes as described above.

In step 611, the slaves on the bus change modes in response to the commands issued by the master.

It should be appreciated that the principles described above may have many variations, and the invention is not intended to be limited to the features and variations described herein.

We claim:

1. A method comprising:
   detecting, on a bus that couples a master device and one or more slave devices, a condition indicative of at least one device coupled to the bus transitioning from a first mode to a second mode, wherein the master device and the one or more slave devices communicate by alternating a voltage level on the bus between a low voltage level and a high voltage level, and wherein the first mode is different from the second mode and the first mode enables the one or more slave devices to initiate an interrupt to the master device; and
   in response to detecting the condition, forcing an extension of the condition on the bus for a predetermined time period.

2. The method of claim 1, wherein forcing the extension of the condition on the bus comprises driving a voltage level of the bus for the predetermined time period.

3. The method of claim 1, wherein the master device and the one or more slave devices communicate by modulating a duration of signal levels on the bus.

4. The method of claim 1, further comprising:
   transitioning, at a first slave device of the one or more slave devices, from the second mode to the first mode; and
   wherein detecting the condition comprises detecting the condition by the first slave device while the first slave device is in the first mode.

5. The method of claim 1, further comprising:
   receiving, at a first slave device of the one or more slave devices, a command from the master device to enter the first mode;

in response to receiving the command, transitioning the first slave device to the first mode; and in response to detecting the condition on the bus, transitioning the first slave device to the second mode.

6. The method of claim 1, wherein a host device comprises the master device, wherein a battery pack comprises a first slave device of the one or more slave devices, and wherein the bus comprises a single-wire bus between the host device and the battery pack.

7. The method of claim 1, further comprising:
from a first slave device of the one or more slave devices, generating an interrupt signal on the bus when the first slave device and the master device are both in the first mode.

8. The method of claim 1, further comprising:
at the master device, detecting an interrupt signal from one of the one or more slave devices and, in response, processing one or more interrupts based on signals read from the one or more slave devices.

9. The method of claim 1, wherein forcing the extension of the condition on the bus is performed by a first of the one or more slave devices.

10. An apparatus comprising:
a bus interface comprising contacts for power and a communication line to couple the apparatus to a bus; and
slave circuitry coupled to the bus interface and configured to communicate with a master device over the bus, wherein the slave circuitry is configured to
communicate with the master device by alternating a voltage level on the bus between a low voltage level and a high voltage level,
detect, on the bus, a condition indicative of at least one device coupled to the bus transitioning from a first mode to a second mode, and
in response to detecting the condition, force an extension of the condition on the bus for a predetermined time period.

11. The apparatus of claim 10, wherein the slave circuitry is configured to force the extension of the condition on the bus by driving a voltage level of the bus for the predetermined time period.

12. The apparatus of claim 10, wherein the slave circuitry is configured to further communicate with the master device by modulating a duration of signal levels on the bus.

13. The apparatus of claim 10, wherein the slave circuitry is configured to transition from the second mode to the first mode; and
wherein the slave circuitry is configured to detect the transition by detecting the condition while in the first mode.

14. The apparatus of claim 10, wherein the slave circuitry is configured to:
receive a command from the master device to enter the first mode;
in response to receiving the command, transition to the first mode; and
in response to detecting the condition on the bus, transition to the second mode.

15. The apparatus of claim 10, wherein the apparatus comprises a host device, which comprises the master device, wherein the apparatus comprises a battery pack, which comprises the slave circuitry, and wherein the bus comprises a single-wire bus between the host device and the battery pack.

16. The apparatus of claim 10, wherein the slave circuitry is configured to generate an interrupt signal on the bus when the slave circuitry is in the first mode.

* * * * *